UNITED STATES PATENT OFFICE.

JAMES R. COLE, OF HOT SPRINGS, ARKANSAS.

IMPROVEMENT IN PROCESSES OF DESICCATING MILK.

Specification forming part of Letters Patent No. 172,090, dated January 11, 1876; application filed August 7, 1875.

*To all whom it may concern:*

Be it known that I, JAMES R. COLE, M. D., of Hot Springs, in the county of Garland and State of Arkansas, have invented a new and Improved Process of Desiccating Milk; and I do hereby declare that the following is a full, clear, and exact description of the same.

The object of this invention is to deprive milk of its water, so as to reduce the nutritious portion thereof to a condensed anhydrous and stable food, in which condition it is more readily transportable, is not liable to decomposition, and adapted to be readily dissolved and made available for purposes for which milk is ordinarily employed.

The invention consists in the particular process of producing the above article by subjecting the milk to the desiccating influence of sulphuric or hydrochloric acid, while in a partial vacuum, and without the application of heat.

In carrying out my invention I place *in vacuo*, or in a chamber connected with an air-pump, a vessel containing either strong sulphuric acid, hydrochloric acid, or chloride of calcium, and besides the same another vessel containing the milk to be desiccated. Now, at each stroke of the piston of the air-pump a portion of the moisture, in the form of vapor, is taken from the air in the chamber, and the strong sulphuric acid having a greater affinity for the water than the milk has it reabsorbs the vapors evaporated from the milk by the partial vacuum. The next stroke of the piston robs the sulphuric acid of a part of its moisture, and the evaporated moisture from the milk supplies the loss. This process being continued, the water of the milk, after a time, becomes entirely evaporated and removed, and there remains of the milk only the oily granules, which constitute a stable, nutritious, and easily transportable food. After the process of desiccation has progressed a certain time, and from one-fifth to one-tenth of the water eliminated, the milk is removed from the vacuum and the process commenced *in vacuo* continued in the open air, the milk showing no disposition to sour or whey, except when the atmosphere is highly charged with electricity. The granules reduced by the above process are anhydrous, and receive water very slowly; but they can be readily dissolved in a portion of fresh milk or glycerine, after which water can be added in quantities to suit, seven parts being about the amount contained in ordinary milk. To facilitate the evaporation outside of the vacuum, air, dried by being passed over chloride of calcium and cooled through a worm, is made to pass over the milk in a drying-chamber. Milk desiccated in this manner is perfectly pure and free from sulphuric acid, and will keep in good condition to an indefinite period.

I am aware of the fact that attempts have been made to produce a desiccated milk by dissolving in the same a given amount of sugar, and then evaporating by an application of heat in the ordinary way; but in this process the heat required for the evaporation is liable to produce uncontrollable chemical changes in the constituents of the milk, which, inducing fermentation, causes the milk to sour before the process is complete. I therefore limit my invention to the particular process of desiccation, whereby are obviated the difficulties existing hitherto as obstacles to success.

Having thus described my invention, what I claim as new is—

The herein-described process of desiccating milk, consisting in first eliminating a portion of the water of the milk in a partial vacuum, in presence of a desiccating agent, and finally continuing the process, thus commenced, to completion in the open air.

The above specification of my invention signed by me this 14th day of July, A. D. 1875.

JAMES ROWE COLE, M. D.

Witnesses:
SIDNEY A. FRANKLIN, M. D.,
THAD. TAYLOR.